Oct. 19, 1965  P. G. SALERNO ETAL  3,212,513

FORCE RESPONSIVE VALVE

Filed Sept. 14, 1962

INVENTORS
PAUL G. SALERNO
ROBERT P. SMITH
BY
ATTORNEYS

United States Patent Office 3,212,513
Patented Oct. 19, 1965

---

3,212,513
FORCE RESPONSIVE VALVE
Paul G. Salerno, Glenview, and Robert P. Smith, Lincolnwood, Ill., assignors to Vapor Corporation, Chicago, Ill., a corporation of Delaware
Filed Sept. 14, 1962, Ser. No. 223,702
7 Claims. (Cl. 137—45)

This invention relates in general to a valve, and more particularly to a valve which is responsive to acceleration or gravity forces.

The valve of the present invention includes generally an elongated bar fixed to a frame and having a fluid passageway with one end opening through the side of the bar to define a port. The other end of the passageway may be connected to a pressurized fluid source. A flexible strip or tape is wrapped around the bar and in alignment with the opening through the side of the bar. Means is provided to tension the tape on the bar and which is suitably weighted so as to react to forces on the valve and control movement of the tape for opening and closing the port in the side of the bar.

More particularly, the bar is cylindrical in shape with one end of the passageway opening through the cylindrical surface and the other end opening through one end of the cylinder. The flexible tape is impervious and the opposite ends extend tangentially of the cylindrical bar and are tensioned in place by means of a U-shaped spring connected to the ends of the tape. The spring is provided with suitable mass so that when the valve is subjected to acceleration or gravitational forces, the spring will tend to raise the tape portion covering the port in the cylindrical surface to thereby open the valve.

In another embodiment of the invention, a plurality of passageways may be provided in the cylinder for additional controls. For example, where a pair of ports are opened and closed by the tape, the valve may be responsive to positive and negative forces.

The pressure response from the valve of the present invention which results from acceleration forces may be used to actuate control surfaces of an airborne vehicle such as a missile, or for any other desirable purpose.

It is therefore an object of this invention to provide an improved valve responsive to acceleration or gravity forces.

Another object of this invention is in the provision of a valve responsive to acceleration or gravity forces capable of sealing off high pressures and yet susceptible to small forces to open and close the valve.

Still another object of this invention resides in the provision of a valve responsive to acceleration or gravity forces, which is constructed of a small number of parts and may be economically and easily manufactured.

A further object of the present invention is to provide a valve responsive to both positive and negative acceleration or gravitational forces.

A still further object of this invention is in the provision of a valve responsive to acceleration or gravitational forces which is capable of operating with low friction losses and at high temperatures.

Other objects, features and advantages of the invention will be apparent from the following detailed disclosure taken in conjunction with the accompanying sheet of drawings, wherein like reference numerals refer to like parts, in which.

Figure 1:
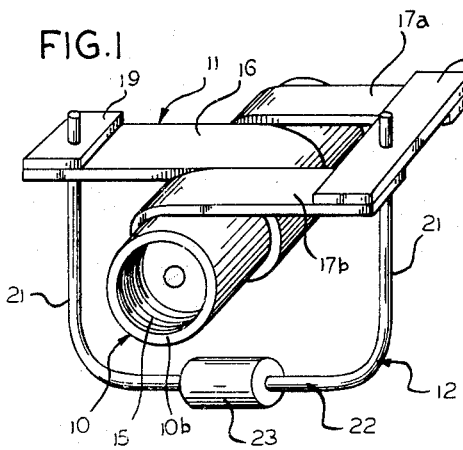
FIG. 1 is a perspective view of the valve according to the present invention and showing it in closed position.

Referring now to the drawings, and particularly to FIG. 1, the preferred embodiment of the present invention generally includes an elongated cylinder 10 having a flexible, impervious tape 11 wrapped therearound and being held in place by a generally U-shaped spring 12. It should be appreciated that the cross-sectional shape of the cylindrical bar 10 may vary within the scope of the present invention. For example, the bar may be oval, triangular, rectangular or polygonal in shape.

Figures 3, 4:
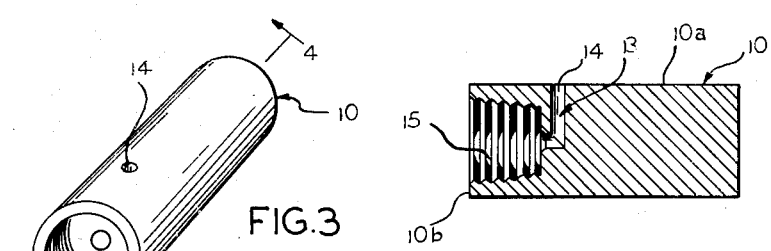
FIG. 3 is a perspective view of the preferred form of bar employed in the present invention.
FIG. 4 is a longitudinal sectional view taken substantially along line 4—4 of FIG. 3.

The cylinder 10 includes a passageway 13, FIG. 4, having one end opening through the cylindrical surface 10a of the cylinder to define a valve port 14, and the other end opening through one end 10b of the cylinder and having formed therewith a tapped opening 15 so that it may be easily connected to a source of fluid pressure or the like.

Figure 2:
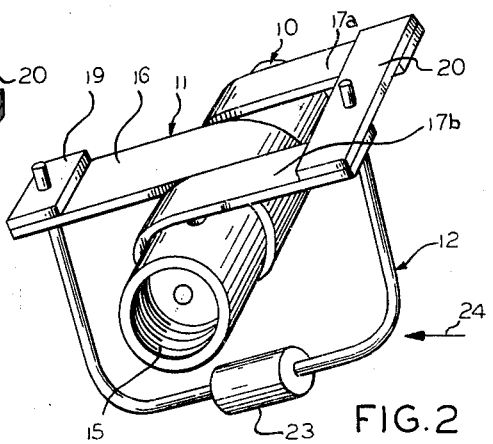
FIG. 2 is a perspective view of the valve according to the present invention, similar to FIG. 1, but showing the valve in open position.
Figure 5:
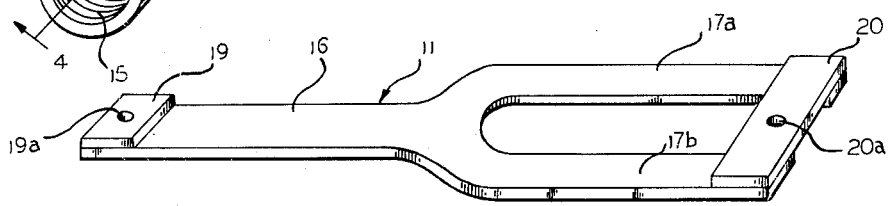
FIG. 5 is a perspective view of the tape prior to mounting same on the cylinder.

The external surface of the cylinder 10 is smoothly finished and has wrapped thereover the flexible tape 11. The tape 11, in its free position as shown in FIG. 5, includes an end portion 16 at one end and a bifurcated end portion at the other end including parallel extending portions 17a and 17b defining a space 18 therebetween through which the end portion 16 may be inserted as shown in FIGS. 1 and 2. The tape 11 may be made of any suitable impervious and flexible material, and if made of thin metal, the valve can withstand extremely high temperatures since there are no sliding parts or close fits.

Figures 6, 7:
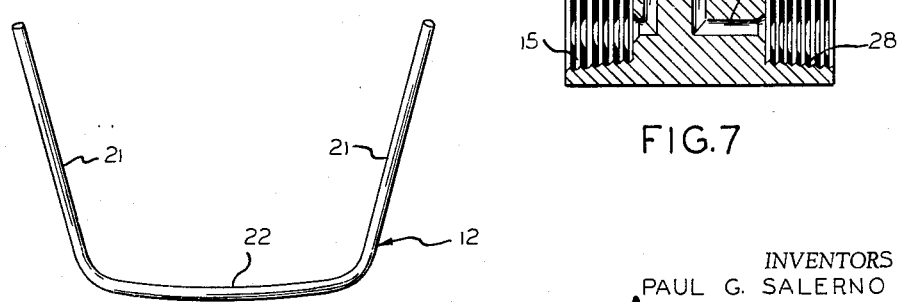
FIG. 6 is a view of the spring showing its free position prior to being assembled with the tape and cylinder.
FIG. 7 is a transverse sectional view taken through a cylindrical bar and illustrating a modification of the invention.

Reinforcing bars 19 and 20 are secured to the opposite end portions of the tape 11 and are provided with openings 19a and 20a, respectively, for receiving the upper end portions of the legs 21 of the U-shaped spring 12. Inasmuch as the legs 21, as connected to the bight portion 22, extend away from each other while in their free position as shown in FIG. 6, the spring 12 exerts a tensioning effect on the tape 11 when assembled therewith as shown in FIG. 1. A suitable weight 23 is mounted on the bight portion 22, but it should be appreciated that if the spring 12 had sufficient mass, it would not be necessary to utilize a weight. Moreover, the tape may take other forms, but the tape as shown and as applied on the cylinder is arranged so that equal tension will be exerted against the opposite ends thereof without the addition of any lateral forces existing along the longitudinal axis of the cylinder. It may be noted that the end portions 16, 17a and 17b of the tape extend tangentially of the cylinder and approximately in the same plane. Moreover, the valve port 14 is arranged to be positioned at the upper center of the bar when the tape has been mounted thereon so that the tape will come in contact with the cylindrical surface of the cylinder in alignment with the valve port 14 and seal it shut as shown in FIG. 1. In this position, the valve is closed.

Thus normally, the weight 23 will maintain the spring 12 and the tape 11 in the position as shown in FIG. 1, wherein the valve is closed. If the valve assembly is accelerated in the direction of the arrow 24, the weight 23 will open the valve as shown in FIG. 2, wherein the weight rotates counter-clockwise about the cylinder and carries the bifurcated portion 17b upwardly and out of engagement with the valve port 14. The rotation of the weight occurs without friction which is important if small accelerations are to be detected. Moreover, the tension in the tape 11 seals off very high pressures, but yet requires little force to open or close the valve.

Any number of passageways and valve ports may be provided in a cylinder bar, and a three-way type valve would include a modified cylinder 25 such as shown in FIG. 7, wherein a passageway 26 is also provided in addition to the passageway 13. Similarly, the passageway 26 includes a valve port 27 opening through the cylindrical surface 25a and a tapped opening 28 opening through the cylinder end 25c. The tapped opening 15 of the passageway 13 opens through the cylinder end face 25b. In this embodiment, one of the bifurcated end portions operates on one of the valve ports, while the center end portion 16 operates on the other valve port. For example, the end portion 17b would operate on the valve port 14 similar to the embodiment of FIG. 1, while the end portion 16 would operate to open and close the valve port 27. When this valve assembly is subjected to a positive acceleration or gravity force, one of the valve ports will open and one will remain closed. Then when the assembly is subjected to a negative acceleration or gravity force, the valve operation is reversed wherein the valve port opening on the positive acceleration will be closed while the other valve port will open.

It will be understood that modifications and variations may be effected without departing from the scope of the novel concepts of the present invention, but it is understood that this application is to be limited only by the scope of the appended claims.

The invention is hereby claimed as follows:

1. In a valve responsive to acceleration or gravity forces, a stationary elongated bar having a uniform cross section and a smooth outer surface, a fluid passageway extending through said bar, one end of the passageway adapted to be connected to a source of fluid pressure and the other end opening through said smooth outer surface to define a valve port, and means normally closing said valve port and responsive to an acceleration or gravity force being applied to said valve for opening said port, said force responsive means including a flexible tape wrapped around said bar and in alignment with said port and tensioning means for exerting a force at the ends of said tape to tension same.

2. In a valve responsive to acceleration or gravity forces, a stationary elongated bar having a uniform cross section and a smooth outer surface, a fluid passageway extending through said bar, one end of the passageway adapted to be connected to a source of fluid pressure and the other end opening through said smooth outer surface to define a valve port, means normally closing said valve port and responsive to an acceleration or gravity force being applied to said valve for opening said port, said force responsive means including a flexible tape wrapped around said bar and in alignment with said port and tensioning means for exerting a force at the ends of said tape to tension same, and a weight attached to said tensioning means.

3. In a valve responsive to acceleration or gravity forces, a cylinder having a fluid passageway, one end of the passageway opening through the cylindrical surface of the cylinder to define a valve port and the other end adapted to be connected to a source of pressurized fluid, means for normally closing said valve port and responsive to acceleration or gravity forces applied to said valve for opening said port, said means including a flexible impervious tape wrapped once around said cylinder and in alignment with said port, spring means connected to the ends of said tape to tension same on the cylinder and normally in sealing engagement with said port, and a weight on said spring coacting therewith to render the tape movable into and out of sealing engagement with said port in response to forces subjected to said valve.

4. In a valve responsive to acceleration or gravity forces, a cylinder having a plurality of fluid passageways, one end of each passageway opening through the cylindrical surface of the cylinder to define valve ports and the other ends adapted to be connected to sources of pressurized fluid, a flexible tape wrapped around said cylinder and normally in sealing engagement with said ports, means for tensioning said tape onto said cylinder including a U-shaped spring that is connected at its ends to the ends of the tape, and means on said spring rendering it capable of responding to acceleration or gravity forces for opening and closing said ports.

5. In a valve responsive to acceleration or gravity forces, a fixed cylinder having a fluid passageway, one end of the passageway opening through the cylindrical surface of the cylinder to define a valve port and the other end opening through one end of the cylinder and adapted to be connected to a source of pressurized fluid, a flexible impervious tape wrapped once around said cylinder with the opposite end portions extending tangential thereof, spring means connected to said end portions to tension the tape and normally maintain a closing portion adjacent an end portion in sealing engagement with said port, and weight means on said spring responsive to acceleration or gravity forces on the valve to cause shifting of said spring and tape end portions to open and close the valve port.

6. In a valve responsive to acceleration or gravity forces, a fixed cylinder having a fluid passageway, one end of the passageway opening through the cylindrical surface of the cylinder to define a valve port and the other end opening through one end of the cylinder and adapted to be connected to a source of pressurized fluid, a flexible impervious tape wrapped once around said cylinder with the opposite end portions extending tangential thereof, said tape being bifurcated at one end to define an opening for the other end to extend through, spring means connected to said end portions to tension the tape and normally maintain a closing portion adjacent an end portion in sealing engagement with said port, and weight means on said spring responsive to acceleration or gravity forces on the valve to cause shifting of said spring and tape end portions to open and close the valve port.

7. In a valve responsive to acceleration or gravity forces, a fixed cylinder having a pair of fluid passageways, one end of each passageway opening through the cylindrical surface of the cylinder to define a pair of valve ports and the other end of one passageway opening through one end of the cylinder and the other end of the other of said passageways opening through the other end of the cylinder, the ends opening through the ends of said cylinder adapted to be connected to sources of pressurized fluid, a flexible impervious tape wrapped once around said cylinder with the opposite ends extending tangential thereof, said tape being bifurcated at one end portion to define an opening for the other end portion to extend through, spring means connected to said end portions to tension the tape and normally maintain one of the bifurcated end portions in sealing engagement with one of the ports and the other end portion in sealing engagement with the other of said ports, and weight means on said spring responsive to acceleration or gravity forces on the valve to cause shifting on said spring and tape end portions to open and close the valve ports in response to forces on the valve.

References Cited by the Examiner

UNITED STATES PATENTS

| 1,393,172 | 10/21 | Seek | 137—45 X |
| 2,516,523 | 7/50 | Mildebrath | 137—45 X |
| 2,532,298 | 12/50 | Goldstein | 137—45 X |
| 2,672,335 | 3/54 | Keller | 137—8 X |
| 2,934,077 | 4/60 | Whiting | 137—38 |

FOREIGN PATENTS

| 119,870 | 4/19 | Great Britain. |

ISADOR WEIL, *Primary Examiner.*

CLARENCE R. GORDON, *Examiner.*